United States Patent
Choi et al.

(10) Patent No.: US 7,638,242 B2
(45) Date of Patent: Dec. 29, 2009

(54) POLYMER ELECTROLYTE COMPOSITION FOR RECHARGEABLE LITHIUM BATTERY AND RECHARGEABLE LITHIUM BATTERY INCLUDING THE SAME

(75) Inventors: Bo-Geum Choi, Suwon-si (KR); Cheol-Soo Jung, Suwon-si (KR); Eui-Hwan Song, Suwon-si (KR)

(73) Assignee: Samsung SDI Co., Ltd., Suwon-si (KR)

( * ) Notice: Subject to any disclaimer, the term of this patent is extended or adjusted under 35 U.S.C. 154(b) by 751 days.

(21) Appl. No.: 11/290,130

(22) Filed: Nov. 29, 2005

(65) Prior Publication Data
US 2006/0141363 A1    Jun. 29, 2006

(30) Foreign Application Priority Data
Nov. 29, 2004    (KR) ................. 10-2004-0098558

(51) Int. Cl.
*H01M 10/40* (2006.01)
(52) U.S. Cl. .................... 429/307; 429/309; 429/317
(58) Field of Classification Search ............... 429/307, 429/309, 316, 317
See application file for complete search history.

(56) References Cited

U.S. PATENT DOCUMENTS

| 6,534,214 | B1 * | 3/2003 | Nishijima et al. ......... 429/307 X |
| 6,569,572 | B1 * | 5/2003 | Ochiai et al. ............ 429/317 X |
| 6,730,440 | B1 * | 5/2004 | Bauer et al. ............. 429/309 X |
| 7,205,073 | B2 * | 4/2007 | Kim et al. .................... 429/307 |
| 2003/0129480 | A1 * | 7/2003 | Akashi et al. ............ 429/316 X |

FOREIGN PATENT DOCUMENTS

JP    2001-110350    4/2001

OTHER PUBLICATIONS

Patent Abstracts of Japan, Publication No. 2001-110350; Publication Date Apr. 20, 2001; in the name of Yamada.

* cited by examiner

*Primary Examiner*—Stephen J. Kalafut
(74) *Attorney, Agent, or Firm*—Christie, Parker & Hale, LLP

(57) ABSTRACT

A polymer electrolyte composition for a rechargeable lithium battery includes an acrylate-based polymer, a lactone-based compound having an alkyl substituent, a non-aqueous organic solvent, and a lithium salt. The electrolyte for a rechargeable lithium battery of the present invention exhibits excellent high temperature storage characteristics, excellent high temperature cycle-life characteristics, and improved safety without deteriorating cell performance.

12 Claims, 2 Drawing Sheets

US 7,638,242 B2

POLYMER ELECTROLYTE COMPOSITION FOR RECHARGEABLE LITHIUM BATTERY AND RECHARGEABLE LITHIUM BATTERY INCLUDING THE SAME

CROSS-REFERENCE TO RELATED APPLICATION

This application claims priority to and the benefit of Korean Patent Application No. 10-2004-0098558 filed in the Korean Intellectual Property Office on Nov. 29, 2004, the entire content of which is incorporated herein by reference.

FIELD OF THE INVENTION

The present invention relates to a polymer electrolyte composition for a rechargeable lithium battery and a rechargeable lithium battery including the polymer electrolyte composition. More particularly, the present invention relates to a polymer electrolyte composition for a rechargeable lithium battery exhibiting good high temperature storage characteristics and good cycle life characteristics, and a rechargeable lithium battery comprising the same.

BACKGROUND OF THE INVENTION

Recently, the rapid development of smaller, lighter, and higher performance communication and other electronic equipment has required the development of high performance and large capacity batteries to power such equipment. The demands for high energy density batteries have fostered investigation of rechargeable lithium batteries. Positive active materials for rechargeable lithium batteries use lithium-transition metal oxides, and negative active materials use crystalline or amorphous carbonaceous materials or carbon composites. The active materials are coated on a current collector with a predetermined thickness and length, or they are formed as a film, to produce electrodes. The electrodes, together with a separator, are wound or stacked to produce an electrode assembly and the electrode assembly is inserted into a battery case, such as a can, followed by insertion of an electrolyte to fabricate a battery.

The electrolyte generally includes a lithium salt and one or more organic solvents. The organic solvents generally include from two to five solvents which may include cyclic carbonates such as ethylene carbonate and propylene carbonate, and linear carbonates such as dimethyl carbonate, ethylmethyl carbonate, and diethyl carbonate. Such organic solvents are highly reactive for a negative electrode and are liable to be decomposed by reacting with the negative electrode during cell operation resulting in the generation of a large amount of gas during charge and discharge. This can cause a reduction in cell stability.

SUMMARY OF THE INVENTION

An exemplary embodiment of the present invention provides a polymer electrolyte composition for a rechargeable lithium battery that provides excellent high temperature storage characteristics and high temperature cycle-life characteristics without deteriorating cell performance.

Another embodiment of the present invention provides a lithium rechargeable battery which includes the electrolyte composition.

According to an embodiment of the present invention, a polymer electrolyte composition is provided which includes an acrylate-based polymer, a lactone-based compound having an alkyl substituent, a non-aqueous organic solvent, and a lithium salt. According to another embodiment, a lithium rechargeable battery is provided, which includes: a polymer electrolyte which is prepared using the electrolyte composition; a positive electrode including a positive active material capable of intercalating and deintercalating lithium ions; and a negative electrode including an active material selected from the group consisting of materials capable of intercalating/deintercalating lithium ions, a lithium metal, a lithium-containing alloy, and a material capable of forming a lithium-containing compound by reversibly reacting lithium.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings, wherein.

DETAILED DESCRIPTION

Figure 1:
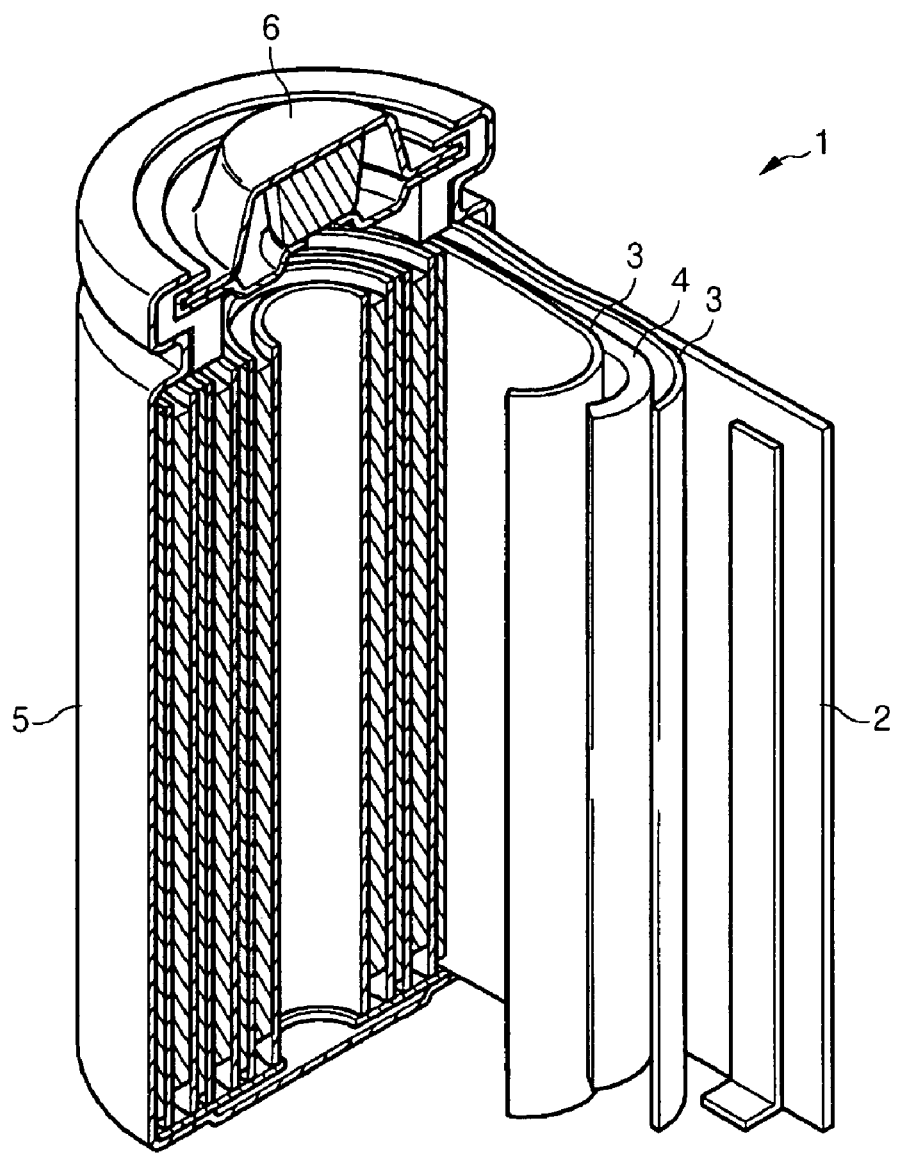
FIG. 1 is a schematic exploded perspective view of a lithium rechargeable battery.

A polymer electrolyte composition for a rechargeable lithium battery in accordance with the present invention improves high temperature storage characteristics and high temperature cycle-life characteristics and improves safety without deteriorating cell performance.

The polymer electrolyte composition includes an acrylate-based polymer, a lactone-based compound having an alkyl substituent, a non-aqueous organic solvent, and a lithium salt.

The acrylate-based polymer may be included in an amount from 0.01 to 2 wt %. When the amount is less than 0.01 wt %, the benefits of the polymer are not realized. When the amount is more than 2 wt %, the cycle-life characteristics may deteriorate.

The acrylate-based polymer is a polymer derived from a (polyester)polyol with at least three hydroxyl (—OH) groups where at least one of the hydroxyl groups is substituted with (meth)acrylic ester, and the remaining hydroxyl group or groups that are not substituted with (meth)acrylic ester are substituted with a group or groups having no radical reactivity.

The acrylate-based polymer is obtained from a (polyester)polyol with at least three hydroxyl groups. An acrylate-based polymer obtained from a (polyester)polyol with less than three hydroxyl groups tends to form a dense and sticky electrolyte, decreasing the mobility of the lithium ions. This decrease of lithium ion mobility deteriorates battery performance at high rate and low temperature characteristics, and decreases the cycle life characteristics.

When an acrylate-based polymer prepared by substituting all of the hydroxyl groups of a (polyester)polyol with a (meth)acrylic ester is used as an electrolytic additive, structural steric hindrance occurs during the gelation reaction in forming the polymer electrolyte, and therefore, an unreacted acrylate group remains in the resultant polymer electrolyte. The unreacted acrylate group has a very strong reactivity, which deteriorates high rate performance or low temperature characteristics.

In one embodiment of a polymer electrolyte, the acrylate-based polymer is derived from a (polyester)polyol with at least three hydroxyl (—OH) groups, where at least one but not all of the hydroxyl groups is substituted with a (meth)acrylic ester, and the remaining hydroxyl group or groups are substituted with one or more groups having no radical reactivity.

As the (polyester)polyol, any (polyester)polyol with at least three hydroxyl groups may be used, regardless of the synthesis method. Suitable (polyester)polyols may be available commercially. Specific examples of the (polyester) polyol include trialkylols, such as trimethylol, triethylol, and tripropylol, and various glycerols, and erythritols, such as pentaerythritol, dipentaerythritol.

The (meth)acrylic ester may be represented by the formula —OC(=O)(CH$_2$)$_n$OC(=O)CH=CH$_2$ or —OC(=O)(CH$_2$)$_n$OC(=O)C(CH$_3$)=CH$_2$ where n is an integer from 1 to 20, and preferably from 1 to 6.

The group having no radical reactivity is a $C_1$ to $C_{20}$ aliphatic hydrocarbon, a $C_5$ to $C_{20}$ aromatic hydrocarbon, a $C_1$ to $C_{20}$ ether, or a $C_1$ to $C_{20}$ ester. Preferred examples include —OC(=O)(CH$_2$)$_3$CH$_3$, —OC(=O)Ar where Ar is an unsubstituted or substituted aromatic hydrocarbon, —OC(=O)(CH$_2$)$_n$O(CH$_2$)$_n$CH$_3$ where n is an integer from 1 to 20, —O(C=O)(CH$_2$)$_n$OC(=O)(CH$_2$)$_n$CH$_3$ where n is an integer from 1 to 20), and —(C=O)CH=CH$_2$.

In one embodiment of the invention, the (meth)acrylic acid or derivative thereof, and the group having no radical reactivity are used in a mole ratio from 1:0.01 to 1:100, and preferably from 1:0.5 to 1:3.

In one embodiment, the acrylate-based polymer has a weight average molecular weight in the range of 100 to 100,000, and preferably from 300 to 10,000.

Specific examples of the acrylate-based polymer include those selected from the group consisting of polyester acrylate polymers, polyestermethacrylate polymers, and combinations thereof.

The lactone-based compound may be provided in an amount ranging from 1 to 10 wt % based on the weight of the non-aqueous solvent. When it is provided in an amount outside of this range, cell performance may deteriorate.

Suitable lactone-based compounds include lactone-based cyclic compounds having an alkyl substituent. Specific examples include those selected from the group consisting of gamma-caprolactone, beta-butyrolactone, gamma-valerolactone, gamma-hepanolactone, gamma-octanolactone, gamma-nonalactone, gamma-decanolactone, delta-caprolactone, delta-heptanolactone, delta-octanolactone, delta-nonalactone, delta-decanolactone, delta-dodecanolactone, and combinations thereof.

The polymer electrolyte composition of the present invention may include an organic acid peroxide which can generate radicals by heat or light. Such an organic acid peroxide may be included in an amount from 100 ppm to 50000 ppm based on the weight of the non-aqueous organic solvent. When the amount of the organic acid peroxide is less than 100 ppm, the film cannot cover the entire area of a battery electrode, whereas, when it is more than 50000 ppm, excessive additives may remain as impurities inside the battery.

Non-limiting examples of the organic acid peroxide include those selected from the group consisting of dilauroyl peroxide, benzoyl peroxide, m-toluoyl peroxide, t-butyl peroxy-2-ethyl hexanoate, t-butylperoxy bivarate, t-butylperoxy neodecanate, diisopropyl peroxy dicarbonate, diethoxy peroxy dicarbonate, bis-(4-t-butylcyclohexyl)peroxy dicarbonate, dimethoxy isopropyl peroxy dicarbonate, dicyclohexyl peroxy dicarbonate, $C_3$ to $C_{30}$ dialkyl or dialkoxy peroxides, and combinations thereof.

Suitable $C_3$ to $C_{30}$ dialkyl or dialkoxy peroxides include isobutyl peroxide, 3,3,5-trimethylhexanoyl peroxide, and combinations thereof.

The acrylate-based polymer and lactone-based compound form a solid electrolyte interface (SEI) film on the surface of an electrode which is stable at high temperatures. The film is expected to improve high temperature storage characteristics and high temperature cycle-life characteristics.

The non-aqueous organic solvent acts as a medium in which ions capable of participating in the electrochemical reaction are mobilized. In one embodiment, the non-aqueous organic solvent includes at least one cyclic carbonate, and a linear carbonate, ester, or ketone. Examples of carbonates include dimethyl carbonate, diethyl carbonate, dipropyl carbonate, methylpropyl carbonate, ethylpropyl carbonate, methylethyl carbonate, ethylene carbonate, propylene carbonate, and butylene carbonate. Examples of esters include γ-butyrolactone (γ-BL), n-methyl acetate, n-ethyl acetate, and n-propyl acetate. Examples of ethers include dibutyl ether. Examples of ketones include polymethylvinyl ketone. It is preferable to use a mixture of a chain carbonate and a cyclic carbonate. The cyclic carbonate and the chain carbonate are preferably mixed together in a volume ratio of 1:1 to 1:9. When the cyclic carbonate and the chain carbonate are mixed in the volume ratio of 1:1 to 1:9 and the mixture is used as an electrolyte, electrolyte performance may be enhanced.

The non-aqueous organic solvent may further include an aromatic hydrocarbon-based organic solvent.

A suitable aromatic hydrocarbon-based organic solvent is represented by formula 1:

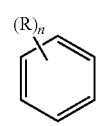

(1)

where R is a halogen or a $C_1$ to $C_{10}$ alkyl or halogenated alkyl, and n is an integer from 0 to 6.

Examples of aromatic hydrocarbon solvents include benzene, fluorobenzene, toluene, trifluorotoluene, chlorobenzene, and xylene. The carbonate solvents and the aromatic hydrocarbon solvents are preferably mixed together in a volume ratio of 1:1 to 30:1. When a carbonate solvent and an aromatic hydrocarbon solvent are mixed with each other in the aforementioned volume ratio, and the mixture is used as an electrolyte, electrolyte performance may be enhanced.

The lithium salt acts in a battery as a supply source of lithium ions, making the basic operation of a lithium secondary battery possible. The lithium salt may be selected from the group consisting of LiPF$_6$, LiBF$_4$, LiSbF$_6$, LiAsF$_6$, LiClO$_4$, LiCF$_3$SO$_3$, Li(CF$_3$SO$_2$)$_2$N, LiC$_4$F$_9$SO$_3$, LiSbF$_6$, LiAlO$_4$, LiAlCl$_4$, LiN(C$_x$F$_{2x+1}$SO$_2$)(C$_y$F$_{2y+1}$SO$_2$) where x and y are natural numbers, LiCl, LiI, and combinations thereof.

The concentration of the lithium salt may range from 0.1 to 2.0M. When the concentration of the lithium salt is less than 0.1M, the electrolyte performance deteriorates due to its ionic conductivity and when the concentration of the lithium salt is greater than 2.0M, the lithium ion mobility decreases due to an increase of the electrolyte viscosity.

A rechargeable lithium battery is fabricated using the above polymer electrolyte composition such as by one of the following processes. According to one method, the polymer electrolyte composition is injected into a battery case, such as a metal can or a pouch, in which a positive electrode, a separator, and a negative electrode are placed, and is heated at 40 to 100° C. for 30 minutes to 8 hours to promote the polymerization reaction and the polymerized composition is then cured to produce the polymer electrolyte. According to another method, the polymer electrolyte composition is coated on a positive or a negative electrode, and heat, ultraviolet rays, or electron beams are irradiated into the electrode to polymerize the polymer electrolyte composition, thereby coating the surface of the positive or negative electrode with the polymer electrolyte. The produced electrode is inserted into a battery case and sealed to fabricate a battery.

The positive electrode includes a positive active material in which lithium intercalation reversibly occurs. Suitable positive active materials include lithiated intercalation compounds, and examples of such positive active materials include compounds represented by formulas 2 to 15.

$$LiAO_2 \quad (2);$$

$$LiMn_2O_4 \quad (3);$$

$$Li_aNi_bB_cQ_dO_2 \quad (4)$$

where $0.95 \leq a \leq 1.1$, $0 \leq b \leq 0.9$, $0 \leq c \leq 0.5$, and $0.001 \leq d \leq 0.1$;

$$Li_aNi_bCo_cMn_dQ_eO_2 \quad (5)$$

where $0.95 \leq a \leq 1.1$, $0 \leq b \leq 0.9$, $0 \leq c \leq 0.5$, $0 \leq d \leq 0.5$, and $0.001 \leq e \leq 0.1$;

$$Li_aAQ_bO_2 \quad (6)$$

where $0.95 \leq a \leq 1.1$, and $0.001 \leq b \leq 0.1$;

$$Li_aMn2Q_bO4 \quad (7)$$

where $0.95 \leq a \leq 1.1$, and $0.001 \leq b \leq 0.1$;

$$DX_2 \quad (8);$$

$$LiDS_2 \quad (9);$$

$$V_2O_5 \quad (10);$$

$$LiV_2O_5 \quad (11);$$

$$LiEO_2 \quad (12);$$

$$LiNiVO_4 \quad (13);$$

$$Li_{3-x}F_2(PO_4)_3 (\text{where } 0 \leq x \leq 3) \quad (14);$$

$$Li_{3-x}Fe_2(PO_4)_3 (\text{where } 0 \leq x \leq 2) \quad (15)$$

where in the above formulas 2 to 15:

A is selected from the group consisting of Co, Ni, Mn, and combinations thereof, B is Co or Mn, D is Ti, Mo, or Mn, E is selected from the group consisting of Cr, V, Fe, Sc, Y, and combinations thereof, F is selected from the group consisting of V, Cr, Mn, Co, Ni, Cu, and combinations thereof, Q is a metal, transition element, or lanthanide metal selected from the group consisting of Al, Cr, Mn, Fe, Mg, La, Ce, Sr, V, and combinations thereof, and X is O or S.

The negative electrode may include a negative active material that reversibly intercalates/deintercalates the lithium ions. Examples of negative active materials include carbonaceous negative active materials, such as crystalline or amorphous carbons, or carbon composites, for example, thermally decomposed carbon, cokes, or graphite, a combusted organic polymer compound, carbon fiber, a tin oxide compound, a lithium metal, or a lithium alloy.

The positive and negative electrodes may include a binder. Suitable binders include conventional binders used for rechargeable lithium batteries as long as the binder firmly adheres to the active materials and the conductive agent on the current collector. The binder may include a binder soluble in an organic solvent or water. Binders soluble in an organic solvent include polytetrafluoroethylene, polyvinylidene fluoride, polyethylene, polypropylene, polyvinylchloride, polyvinylpyrrolidone, and polyvinylalcohol.

Suitable water-soluble binders include non-fluorine-based organic polymers or copolymers having butadiene groups. The copolymers having butadiene groups may include styrene-butadiene rubber, carboxyl modified styrene-butadiene rubber, and acrylonitrile-butadiene rubber. In addition, sodium polyacrylate, a copolymer of propylene and a $C_2$ to $C_8$ olefin, or a copolymer of (meth)acrylic acid and (meth)acrylic acid alkyl ester may be used as the binder.

The water-soluble binder may be used along with a water-soluble thickener for improving adherence. Suitable water-soluble thickeners include cellulose-based compounds such as carboxylmethyl cellulose, hydroxypropyl cellulose, hydroxypropyl methyl cellulose, hydroxyethyl cellulose, hydroxypropyl ethyl cellulose, and methyl cellulose. The water-soluble thickeners may also include alkali metal salts of cellulose-based compounds. The alkali metal salt may include an alkali metal such as Na, K, or Li. The alkali metal salt along with the cellulose-based compound can improve high rate discharge characteristics better than a cellulose-based compound alone.

A separator may additionally be used for inhibiting a short circuit between the positive electrode and the negative electrode, or alternatively the polymer electrolyte may act as the separator, making the use of a separator optional. The separator may be a conventional polymer membrane of polyolefin, such as polypropylene, or polyethylene, a multilayered polyolefin polymer, a microporous film, a woven fabric, or a non-woven fabric.

The above-described rechargeable lithium battery including the polymer electrolyte, positive electrode, negative electrode, and separator may be provided as a unit cell having a structure of positive electrode/separator/negative electrode, a bicell having a structure of positive electrode/separator/negative electrode/separator/positive electrode, or a stack-type cell including a plurality of unit cells.

A typical structure of a rechargeable lithium battery is shown in FIG. 1. FIG. 1 shows a cylindrical lithium battery 1 which includes a negative electrode 2, a positive electrode 4, a polymer electrolyte 3 interposed between the negative electrode 2 and positive electrode 4, a battery case 5, and a sealing member 6. The shape of the rechargeable lithium battery in accordance with the present invention is not limited to the above, and may be a prismatic, pouch-type, or other type of rechargeable lithium battery.

The present invention is further explained in more detail with reference to the following examples. The examples, however, should not be interpreted as limiting the scope of the present invention.

EXAMPLE 1

1 mole of dipentaerythritol and 2 moles of ε-caprolactone were added to a toluene solvent, a tetrapropyltitanate catalyst was added in an amount of 0.01 wt %, and a reaction was carried out at 50° C. to synthesize a dipentaerythritol monomer wherein a portion of the hydroxyl groups were substituted with ε-caprolactone. 1 mole of the dipentaerythritol monomer, 4 moles of acrylic acid, and 2 moles of butylcarbonic acid were reacted to obtain a polyester hexaacrylate compound where four hydroxyl (—OH) groups of the monomer were substituted with —OC(=O)(CH$_2$)$_5$OC(=O)CH=CH$_2$ and two hydroxyl (—OH) groups were substituted with —OC(=O)(CH$_2$)$_3$CH$_3$.

0.3 wt % of the resulting polyester hexaacrylate-based compound and 3 wt % of gamma-caprolactone were added to 1M LiPF$_6$ dissolved in a mixed solvent of ethylene carbonate and ethylmethylcarbonate and agitated for ten minutes to prepare an electrolyte composition.

An electrode assembly which includes a positive electrode including lithium cobalt oxide as a positive active material and a negative electrode including artificial graphite as a negative active material was inserted into a battery case, the electrolyte composition was injected, and then heat-treated at 70° C. for 2 hours to fabricate a rechargeable lithium battery cell in which a polymer electrolyte was formed.

Comparative Example 1

A rechargeable lithium battery cell was fabricated in the same manner as Example 1, except that 1M LiPF$_6$ dissolved in a mixed solvent of ethylene carbonate and ethylmethyl carbonate was used as an electrolyte.

Comparative Example 2

A rechargeable lithium battery cell was fabricated in the same manner as Example 1, except that gamma-caprolactone was not used.

Comparative Example 3

A rechargeable lithium battery cell was fabricated in the same manner as Example 1, except that monofluoroethylene carbonate was used instead of gamma-caprolactone.

Comparative Example 4

A rechargeable lithium battery cell was fabricated in the same manner as Example 1, except that the polyester hexaacrylate-based compound was not used.

Figure 2:
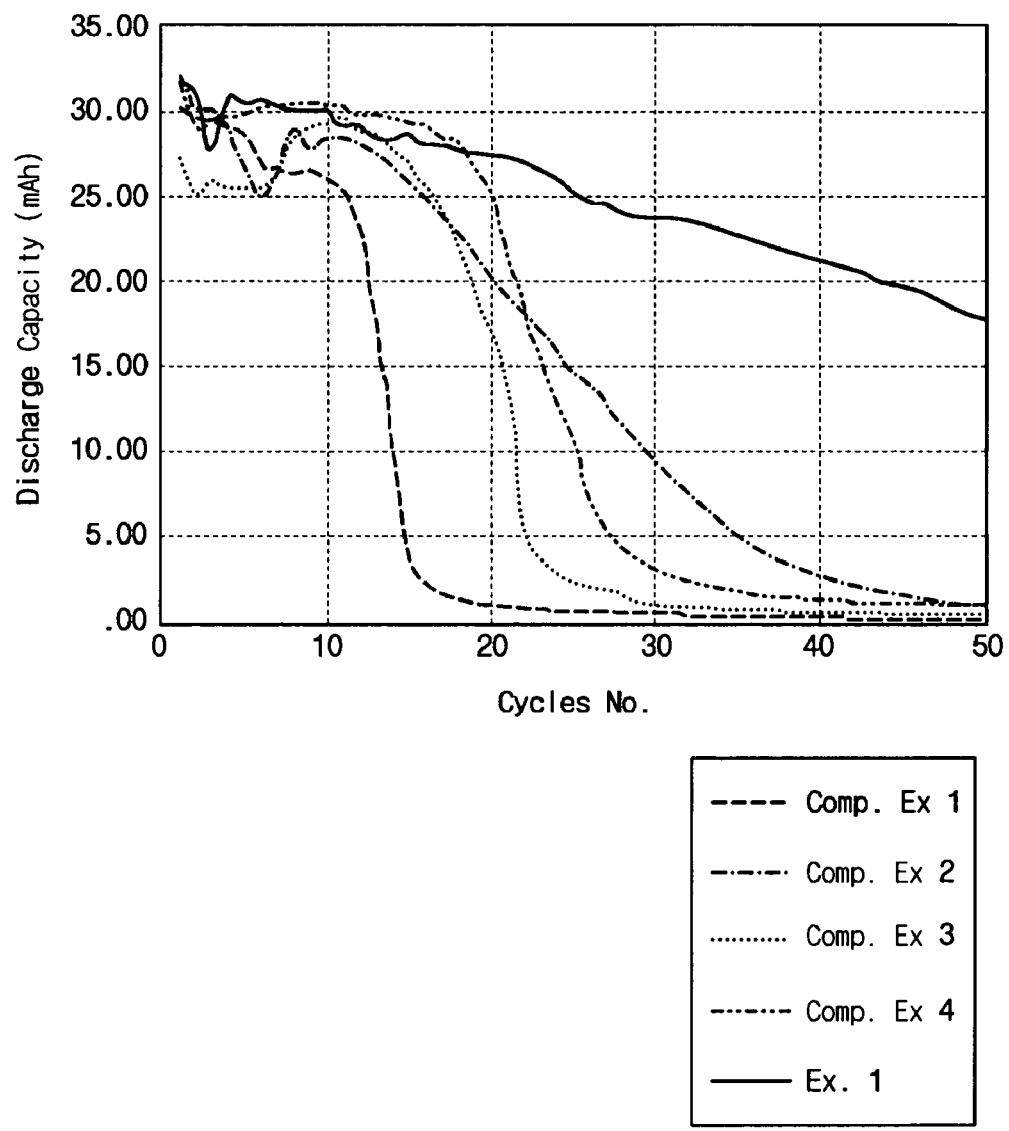
FIG. 2 is a graph showing the high temperature cycle-life characteristics of the rechargeable cells according to Example 1 and Comparative Examples 1 to 4.

Cycle-life characteristics of the rechargeable battery cells according to Example 1 and Comparative Examples 1 to 4 were measured at a high temperature of 75° C. The results are shown in FIG. 2. As shown in FIG. 2, the cell of Example 1 showed about 60% capacity retention after 50 charge and discharge cycles. In contrast, the cells of Comparative Examples 1 to 4 showed remarkably reduced capacity retention after only 15 charge and discharge cycles such that the cells could no longer be used.

As described above, the electrolyte for a rechargeable lithium battery of the present invention implements excellent high temperature storage characteristics and high temperature cycle-life characteristics, and improved safety without deteriorating cell performance.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A polymer electrolyte composition for a rechargeable lithium battery, comprising:
    an acrylate-based polymer;
    a non-aqueous organic solvent;
    a lactone-based compound having an alkyl substituent, present in an amount from 1 to 10 wt % based on the weight of the non-aqueous organic solvent; and
    a lithium salt.

2. The polymer electrolyte composition of claim 1, wherein the acrylate-based polymer is present in an amount from 0.1 to 2 wt %.

3. The polymer electrolyte composition of claim 2, wherein the acrylate-based polymer is selected from the group consisting of polyester acrylate polymer, polyestermethacrylate polymer, and combinations thereof.

4. The polymer electrolyte composition of claim 1, wherein the lactone-based compound is selected from the group consisting of gamma-caprolactone, beta-butyrolactone, gamma-valerolactone, gamma-hepanolactone, gamma-octanolactone, gamma-nonalactone, gamma-decanolactone, delta-caprolactone, delta-heptanolactone, delta-octanolactone, delta-nonalactone, delta-decanolactone, delta-dodecanolactone, and combinations thereof.

5. The polymer electrolyte composition of claim 1, further comprising an organic acid peroxide.

6. The polymer electrolyte composition of claim 5, wherein the organic acid peroxide is present in an amount from 100 ppm to 50000 ppm based on the weight of the non-aqueous organic solvent.

7. The polymer electrolyte composition of claim 5, wherein the organic acid peroxide is selected from the group consisting of dilauroyl peroxide, benzoyl peroxide, m-toluoyl peroxide, t-butyl peroxy-2-ethyl hexanoate, t-butylperoxy bivarate, t-butylperoxy neodecanate, diisopropyl peroxy dicarbonate, diethoxy peroxy dicarbonate, bis-(4-t-butylcyclohexyl)peroxy dicarbonate, dimethoxy isopropyl peroxy dicarbonate, dicyclohexyl peroxy dicarbonate, C$_3$ to C$_{30}$ dialkyl peroxide, C$_3$ to C$_{30}$ dialkoxy peroxide, and combinations thereof.

8. A rechargeable lithium battery comprising:
    a polymer electrolyte composition comprising
        an acrylate-based polymer;
        a non-aqueous organic solvent;
        a lactone-based compound having an alkyl substituent, present in an amount from 1 to 10 wt % based on the weight of the non-aqueous organic solvent; and
        a lithium salt;
    a positive electrode comprising a positive active material capable of intercalating and deintercalating lithium ions; and
    a negative electrode comprising an active material selected from the group consisting of materials capable of intercalating/deintercalating lithium ions, lithium metal, lithium-containing alloys, and materials capable of forming a lithium-containing compounds by reversibly reacting lithium.

9. The rechargeable lithium battery of claim 8, wherein the acrylate-based polymer is selected from the group consisting of polyester acrylate polymer, polyestermethacrylate polymer, and combinations thereof.

10. The rechargeable lithium battery of claim 8, wherein the lactone-based compound is selected from the group consisting of gamma-caprolactone, beta-butyrolactone, gamma-valerolactone, gamma-hepanolactone, gamma-octanolactone, gamma-nonalactone, gamma-decanolactone, delta-caprolactone, delta-heptanolactone, delta-octanolactone, delta-nonalactone, delta-decanolactone, delta-dodecanolactone, and combinations thereof.

11. The rechargeable lithium battery of claim 8, further comprising an organic acid peroxide.

12. The rechargeable lithium battery of claim 11, wherein the organic acid peroxide is selected from the group consisting of dilauroyl peroxide, benzoyl peroxide, m-toluoyl peroxide, t-butyl peroxy-2-ethyl hexanoate, t-butylperoxy bivarate, t-butylperoxy neodecanate, diisopropyl peroxy dicarbonate, diethoxy peroxy dicarbonate, bis-(4-t-butylcyclohexyl)peroxy dicarbonate, dimethoxy isopropyl peroxy dicarbonate, dicyclohexyl peroxy dicarbonate, $C_3$ to $C_{30}$ dialkyl peroxide, $C_3$ to $C_{30}$ dialkoxy peroxide, and combinations thereof.

* * * * *

UNITED STATES PATENT AND TRADEMARK OFFICE
CERTIFICATE OF CORRECTION

PATENT NO. : 7,638,242 B2  Page 1 of 1
APPLICATION NO. : 11/290130
DATED : December 29, 2009
INVENTOR(S) : Choi et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1065 days.

Signed and Sealed this

Ninth Day of November, 2010

David J. Kappos
*Director of the United States Patent and Trademark Office*

UNITED STATES PATENT AND TRADEMARK OFFICE
CERTIFICATE OF CORRECTION

| | |
|---|---|
| PATENT NO. | : 7,638,242 B2 |
| APPLICATION NO. | : 11/290130 |
| DATED | : December 29, 2009 |
| INVENTOR(S) | : Bo-Geum Choi et al. |

It is certified that error appears in the above-identified patent and that said Letters Patent is hereby corrected as shown below:

In the Claims

Column 8, Claim 8, line 53          Delete "a"

Signed and Sealed this
Twenty-first Day of June, 2011

David J. Kappos
*Director of the United States Patent and Trademark Office*